US007658552B2

(12) United States Patent
Asghari

(10) Patent No.: US 7,658,552 B2
(45) Date of Patent: Feb. 9, 2010

(54) INTERFACE BETWEEN LIGHT SOURCE AND OPTICAL COMPONENT

(75) Inventor: Mehdi Asghari, San Marino, CA (US)

(73) Assignee: Kotura, Inc., Monterey Park, CA (US)

( * ) Notice: Subject to any disclaimer, the term of this patent is extended or adjusted under 35 U.S.C. 154(b) by 0 days.

(21) Appl. No.: 12/215,693

(22) Filed: Jun. 28, 2008

(65) Prior Publication Data

US 2009/0324173 A1 Dec. 31, 2009

(51) Int. Cl.
*G02B 6/26* (2006.01)
*G02B 6/42* (2006.01)
*G02B 6/36* (2006.01)
(52) U.S. Cl. .......................................... 385/89; 385/52
(58) Field of Classification Search .................. 385/52, 385/88–94
See application file for complete search history.

(56) References Cited

U.S. PATENT DOCUMENTS 5,881,190 A    3/1999   Harpin et al.

OTHER PUBLICATIONS

Kuniharo Kato, *PLC Hybrid Integration Technology and Its Application to Photonic Components*, IEEE Journal of Selected Topics in Quantum Electronics, vol. 6, No. 1, Jan./Feb. 2000 (pp. 4-13).
Tim Bestwidk, *A Silicon-Based Integration Optical Manufacturing Technology*, 1998 Electronic Components and Technology Conference (pp. 566-571).

*Primary Examiner*—Kevin S Wood
(74) *Attorney, Agent, or Firm*—Gavrilovich, Dodd & Lindsey, LLP

(57) ABSTRACT

An optical system includes an optical device having waveguides defined in a first light transmitting medium. The optical device includes stops extending upward from a laser platform. The system also includes a laser bar having a plurality of lasers. The laser bar is positioned on the platform such that each laser is aligned with one of the waveguides. The laser bar includes alignment trenches that each includes a secondary stop extending upward from a bottom of the alignment trench. The secondary stop includes layers of material having different composition. The stops each extend into an alignment trenches such that each stop contacts one of the secondary stops.

26 Claims, 5 Drawing Sheets

7,658,552 B2

INTERFACE BETWEEN LIGHT SOURCE AND OPTICAL COMPONENT

FIELD

The present invention relates to optical devices and particularly, to the interface between a light source and the optical device.

BACKGROUND

Optical systems are increasingly being used for a variety applications such as communications between people and/or electrical devices. These networks often employ lasers as the source of the light signals that are processed by the network. The networks employ optical devices such as planar optical devices to process the light signals generated by the lasers. The optical devices often have one or more waveguides that must be accurately aligned with the lasers in order to achieve proper performance of the optical device. Acceptable horizontal alignment can often be achieved by aligning marks on the laser with marks on the optical devices, however, the quality of vertical alignment is often dependent on less accurate techniques such as etching. As a result, these is a need for improving alignment between lasers and optical devices.

SUMMARY

An optical system includes an optical device having waveguides defined in a first light transmitting medium that is positioned on a base. The optical device includes stops extending upward from a laser platform. The system also includes a laser bar having a plurality of lasers. The laser bar is positioned on the platform such that each laser is aligned with one of the waveguides. The laser bar includes alignment trenches that each includes a secondary stop which may extend upward from a bottom of the alignment trench. The secondary stops each include layers of material that each has a different composition than the one or more layers that contact that layer. The stops each extend into one of the alignment trenches such that each stop contacts one of the secondary stops.

Another embodiment of an optical system includes an optical device having optical waveguides defined in a first light transmitting medium that is positioned on a base. The optical device includes stops extending upward from a laser platform. The system also includes a laser bar having lasers. The laser bar is positioned on the platform with each laser aligned with one of the waveguides. The laser bar includes alignment trenches that each includes a secondary stop. The secondary stops each include layers of material that each have a different composition than the one or more layers that contact that layer. The stops each extend into one of the alignment trenches such that each stop contacts one of the secondary stops.

A method of forming an optical system includes generating an optical device having waveguides defined in a first light transmitting medium that is positioned on a base. The optical device includes stops extending upward from a laser platform. The method also includes generating a laser bar having lasers and including alignment trenches that each includes a secondary stop extending upward from a bottom of the alignment trench. The secondary stops each include layers of material that each has a different composition than the one or more layers that contact that layer. The method also includes removing one or more of the layers and placing the laser bar on the optical device with each of the stops extending into one of the alignment trenches with each of the stops contacting a secondary stop.

Another method of forming an optical system includes generating an optical device having waveguides defined in a first light transmitting medium. The first light-transmitting medium is positioned on a base. The optical device includes stops extending upward from a laser platform. The method also includes generating a laser bar having lasers and including alignment trenches that each includes a secondary stop. The secondary stops each includes layers that each has a thickness less than 5 microns. The method also includes removing one or more of the layer and placing the laser bar on the optical device with the stops each extending into one of the alignment trenches with each of the stops contacting a secondary stop.

BRIEF DESCRIPTION OF THE FIGURES

FIG. 1A is a topview of the optical device.

FIG. 1B is a cross-section of the device shown in FIG. 1A taken along the line labeled B in FIG. 1A.

FIG. 2A is a bottom view of the laser bar.

FIG. 2B is a cross-section of the laser bar shown in FIG. 2A taken along the line labeled B in FIG. 2A.

FIG. 2C is a cross-section of the laser bar shown in FIG. 2A taken along the line labeled C in FIG. 2A.

FIG. 2D is a topview of the laser bar.

FIG. 3A shows the laser bar and the optical device before assembly of the optical system. FIG. 3A shows the relative positions of different features of the optical device when looking at a sideview of the optical device. In contrast, the laser bar illustrated in FIG. 3A is a cross-sectional view of the laser bar such as the cross section of FIG. 2C.

FIG. 3B shows the laser bar and the optical device of FIG. 3A after assembly of the optical system.

FIG. 4A is a cross-section of a laser bar such as the cross-section of FIG. 2C and is taken before the formation of the secondary stop is completed.

FIG. 4B illustrates the laser bar of FIG. 4A after a portion of the sub-layers are removed from the secondary stop of FIG. 4B.

DESCRIPTION

The optical system includes an optical device having optical waveguides on a base. The optical device including stops extending upward from a laser platform. The optical system also includes a laser bar having a plurality of lasers. The laser bar is positioned on the laser platform such that each laser is aligned with one of the waveguides. The laser bar includes alignment trenches spaced apart from the lasers. Each alignment trench includes a secondary stop. In some instances, the secondary stops extend upward from the bottom of the alignment trenches. The stops extend from the device into contact with the secondary stops in the alignment trenches. As a result, the stops and secondary stops stop movement of the laser bar toward the optical device and accordingly determine the vertical position of the lasers relative to the waveguides.

The tops of the secondary stops can include an alignment layer that includes a series of sub-layers. In some instance, each of the sub-layers has a composition that can act as an etch stop against one of several different etches. The alignment layer can be accurately given a particular height by identifying an etch (or combination of etches) that will etch the secondary stops down to a particular sub-layer that will act as an etch-stop against the last etch. As a result, the secondary stops can be fabricated with a particular height.

Each of the sub-layers can have a particular height relative to the laser mode. For instance, the sub-layers can also be used to constrain the laser modes within the lasers. As a result, the ability to control the height of the secondary means that the height of the secondary stops relative to the laser modes can also be controlled. Further, since the secondary stops determine the vertical position of the laser relative to the waveguides and the position of the secondary stops relative to the laser modes can be accurately controlled, the vertical position of the laser mode relative to the waveguide is also accurately controlled. As a result, the use of the sub-layers permits accurate vertical alignment of the laser bar with the optical device.

Figure 1A:
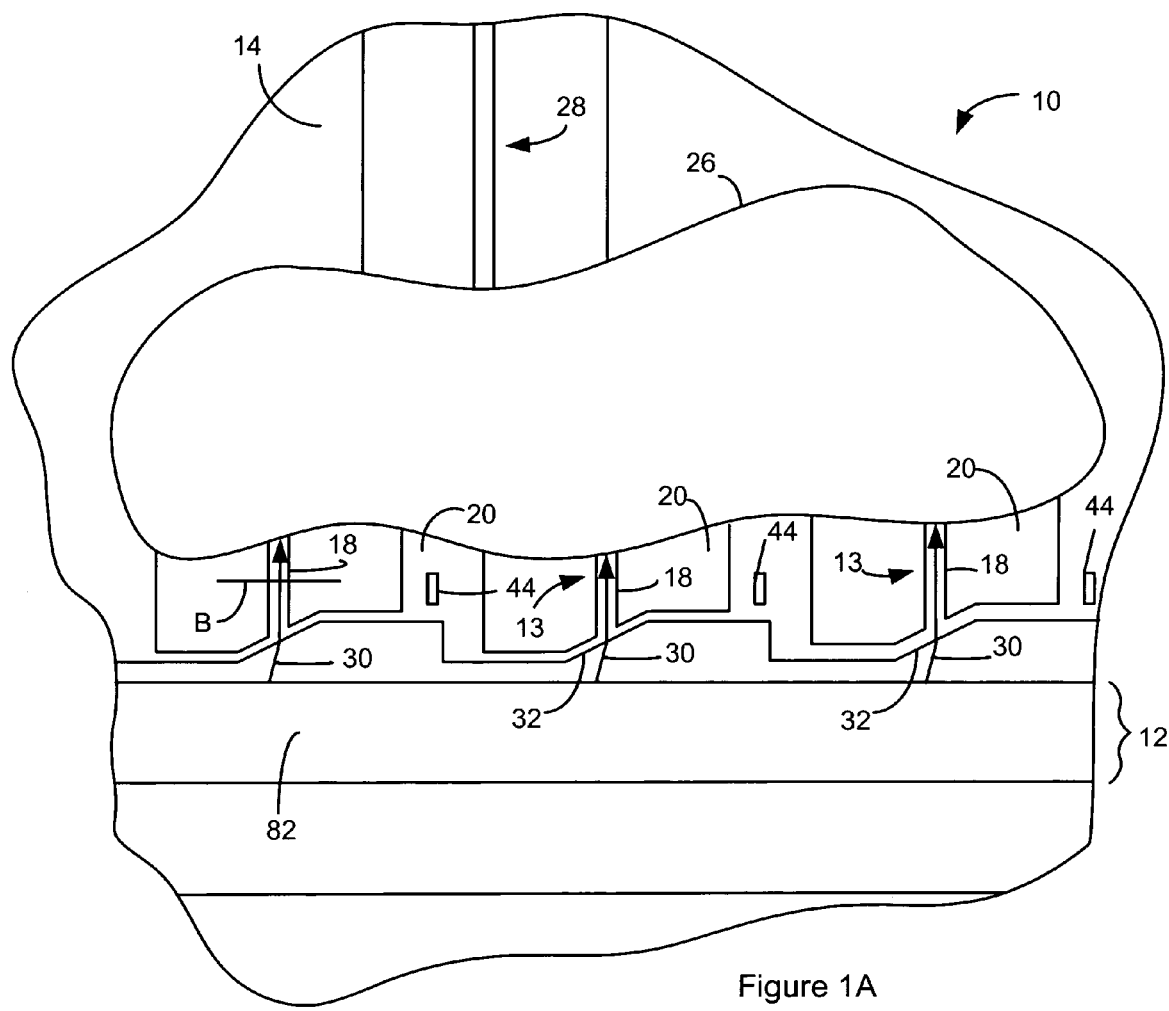
FIG. 1A through FIG. 1B illustrate an optical system having an interface between an optical device and a laser bar.
Figure 1B:
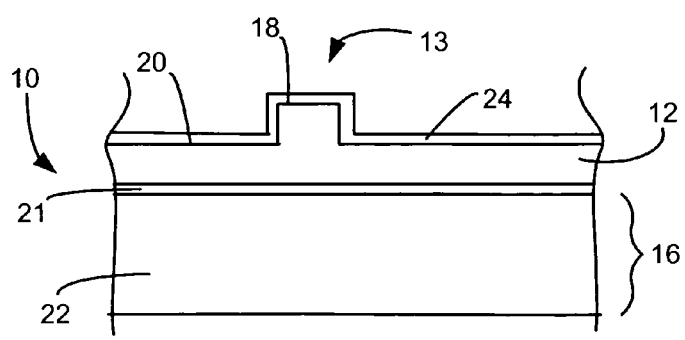

FIG. 1A through FIG. 1B illustrate an optical system having an interface between an optical device 10 and a laser bar 12. FIG. 1A is a topview of the optical device 10. FIG. 1B is a cross-section of the device 10 shown in FIG. 1A taken along the line labeled B in FIG. 1A.

The optical device 10 includes a plurality of waveguides 13 defined in a first light-transmitting medium 14 positioned on a base 16. The first light-transmitting medium 14 includes a ridge 18 defined by trenches 20 that extend into the first light-transmitting medium 14 on opposing sides of the ridge 18. The ridge 18 defines an upper portion of the waveguide 13. Suitable first light-transmitting media include, but are not limited to, silicon, polymers, silica, SIN, GaAs, InP and $LiNbO_3$. The portion of the base 16 adjacent to the first light-transmitting medium 14 is configured to reflect light signals from the waveguide 13 back into the waveguide 13 in order to constrain light signals in the waveguide 13. For instance, the portion of the base 16 adjacent to the first light-transmitting medium 14 can be an optical insulator 21 with a lower index of refraction than the first light-transmitting medium 14. The drop in the index of refraction can cause reflection of a light signal from the first light-transmitting medium 14 back into the first light-transmitting medium 14. The base 16 can include the optical insulator 21 positioned on a substrate 22. The trenches 20 can extend through the first light-transmitting medium 14 to the base 16 or can extend part-way into the first light-transmitting medium 14 as is evident in FIG. 1A.

As will be discussed in more detail below, a cladding 24 can be formed over the first light-transmitting medium 14. The cladding 24 is not illustrated in FIG. 1A but is shown in FIG. 1B. Suitable claddings 24 include, but are not limited to, silicon nitride (SiN) and silica ($SiO_2$) and can include one layer or more than one layer of material.

In one example, the device 10 includes a silicon-on-insulator wafer. A silicon-on-insulator wafer includes a silicon layer that serves as the first light-transmitting medium 14. The silicon-on-insulator wafer also includes a layer of silica positioned on a silicon substrate 22. The layer of silica can serve as the optical insulator 21 and the silicon substrate 22 can serve as the substrate 22.

The device 10 includes components 26 that receive light signals 30 from the waveguides 13. Example components include optical components such as amplifiers, switches, multiplexers, demultiplexers, variable optical attenuators, and optical vias such as are disclosed in U.S. patent application Ser. No. 11/985,065 and incorporated herein in its entirety. The components can additionally or alternately include electrical components including light sensors such as photodiodes, electrical circuits, resistors, capacitors and transmission lines.

The device 10 of FIG. 1A shows only a single secondary waveguide 28 configured to carry light signals to and/or from the components, however, the device 10 can include more than one secondary waveguide 28 configured to carry light signals to and/or from the components or can exclude any secondary waveguides 28 configured to carry light signals to and/or from the components.

The waveguides 13 in the optical device 10 of FIG. 1A each receives a light signal from a laser in the laser bar 12. The light signal enters the waveguide 13 through a facet 32. The facet 32 can be angled at less than 90° relative to the direction of propagation through the waveguide 13 at the facet 32. The angle can reduce performance reduction associated with back reflection.

Figure 1C:
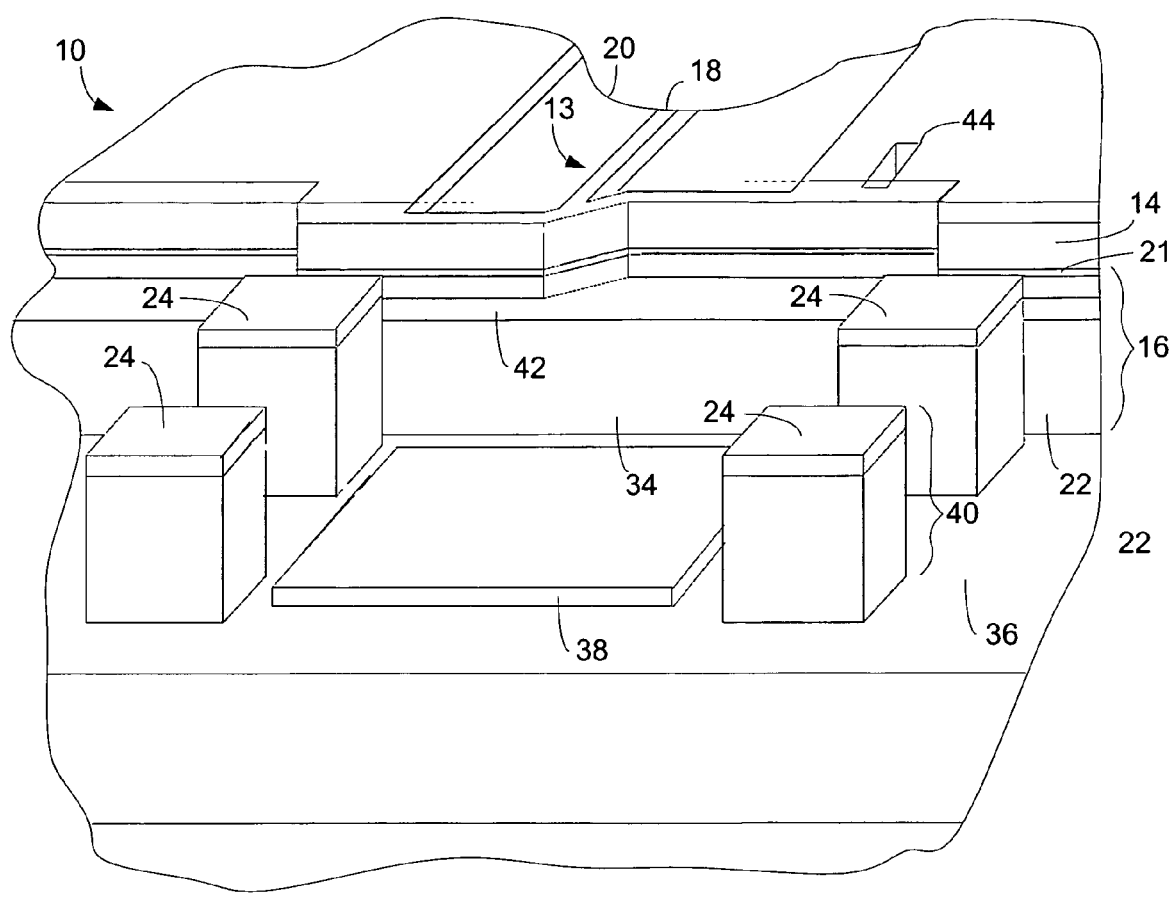
FIG. 1C is a perspective view of a portion of an optical device suitable for interfacing with a laser bar as illustrated in FIG. 1A.

FIG. 1C is a perspective view of a portion of an optical device 10 suitable for interfacing with a laser bar 12 as illustrated in FIG. 1A. The illustrated portion of the optical device 10 is suitable for interfacing with one of the lasers on the laser bar 12. The laser bar 12 is not illustrated in FIG. 1C in order to make the portion of the optical device 10 under the laser bar 12 visible. The cladding 24 is shown on the first light-transmitting medium 14. While the cladding 24 is present over the waveguide 13 and in the trenches 20, the cladding 24 is not shown in these locations in order to make certain features of the optical device 10 readily visible.

A recess extends into the base 16 to form a laser platform 36. A contact pad 38 positioned on the laser platform 36 can be employed for providing electrical communication with a laser on the laser bar 12. One or more stops 40 extend upward from the laser platform 36. For instance, FIG. 4 illustrates four stops 40 extending upward from the laser platform 36. The stops 40 include the cladding 24 positioned on a base portion. The substrate 22 can serve as the base portion of the stops 40 and the stop 40 can exclude the light insulator 21 or be made of the same material as the light insulator 21. The portion of the substrate 22 included in the stops 40 can extend from the platform 36 up to the level of the light insulator 21. For instance, the stops 40 can be formed by etching through the light insulator 21 and using the underlying substrate 22 as an etch-stop. The cladding 24 can then be formed on the first light-transmitting medium 14 at the same time the cladding 24 is formed on the base portion of the stops 40.

A secondary platform 42 can optionally be positioned between the facet 32 of the waveguides 13 and the laser platform 36. The secondary platform 42 is elevated relative to the laser platform 36. For instance, the secondary platform 42 can be above the laser platform 36 and at or below the level of the light insulator 21. The secondary platform 42 can essentially be the top of the substrate 22 or the secondary platform 42 can be positioned below the level of the light insulator 21 as illustrated in FIG. 1C. Alternately, the secondary platform 42 can be etched concurrently with the base portion of the stops 40 resulting in the secondary platform 42 and the base portion of the stops having about the same height above the laser platform 36. Alternately, the secondary platform may not be present at all. For instance, the portion of the base between the laser platform and the waveguide facet can be substantially vertical relative to the laser platform.

The optical device 10 includes one or more alignment marks. Suitable marks include recesses that extend into the optical device. An alignment recess can extend into the first light-transmitting medium 14 and/or the base 16. In some instances, one or more of the alignment recesses extend into the secondary platform 42. FIG. 1A through FIG. 1C illustrate alignment recesses extending into the first light-transmitting medium 14. As will be described in more detail below, during attachment of the laser bar 12 to the optical device 10, the alignment recesses 44 can be aligned with secondary alignment recesses 80 on the laser bar 12 in order to achieve horizontal alignment of the laser bar 12 relative to the optical device 10.

Figure 2A:
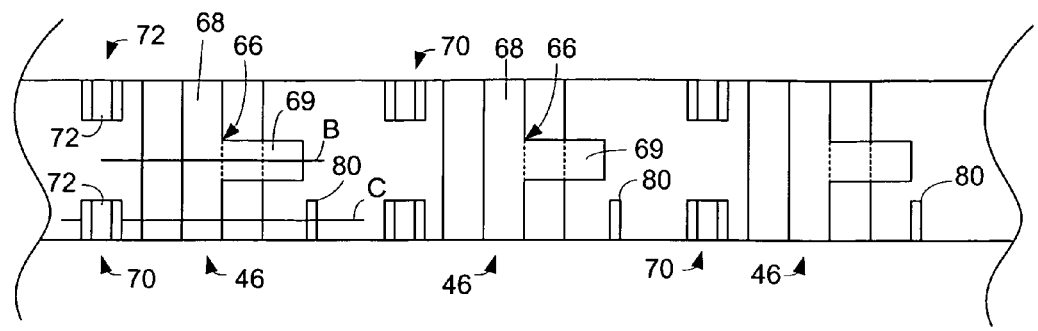
FIG. 2A through FIG. 2D illustrate a laser bar that is suitable for use with an optical device constructed according to FIG. 1A through FIG. 1C.
Figure 2B:
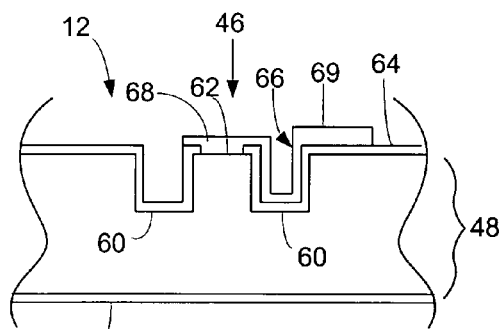
Figure 2C:
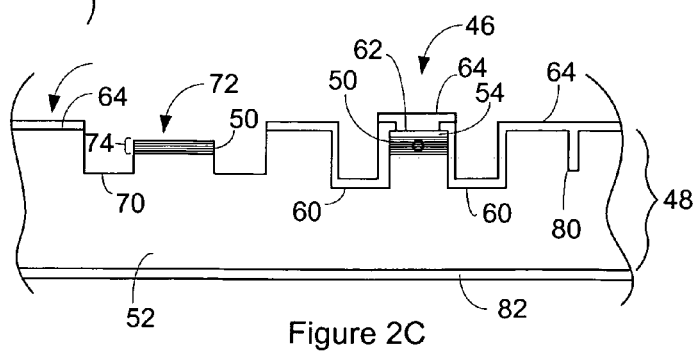
Figure 2D:
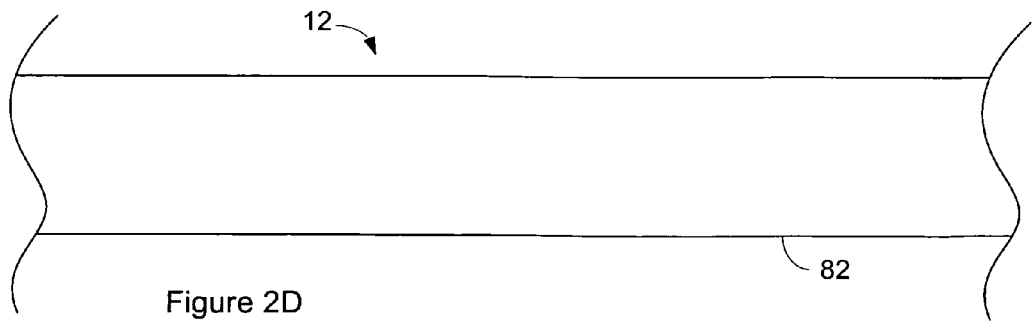

FIG. 2A through FIG. 2D illustrate a laser bar 12 that is suitable for use with an optical device 10 constructed according to FIG. 1A through FIG. 1C. FIG. 2A is a bottom view of the laser bar 12. FIG. 2B is a cross-section of the laser bar 12 shown in FIG. 2A taken along the line labeled B in FIG. 2A. FIG. 2C is a cross-section of the laser bar 12 shown in FIG. 2A taken along the line labeled C in FIG. 2A. FIG. 2D is a topview of the laser bar 12.

The laser bar 12 includes multiple lasers 46 defined in a gain medium 48 where light signals are lased. The gain medium 48 includes sub-layers 50 between a lower gain medium 52 and an upper gain medium 54. The lower gain medium 52 and the upper gain medium 54 can be the same or different. Suitable lower gain media include, but are not limited to, InP, InGaAsP, and GaAs. Suitable upper gain media include, but are not limited to, InP, InGaAsP, and GaAs. As will be discussed in more detail below, each of the sub-layers 50 can have a different composition of a material than the one or more sub-layers 50 that contact that layer sub-layer. In some instances, each of the sub-layers 50 has a different chemical composition. Each sub-layer or a portion of the sub-layers can include or consists of two or more components of selected from a group consisting of In, P, Gs, and As. In some instances, the upper gain medium 54 is optional.

The lasers 46 each include a facet through which a light signal exits the laser 46. As is known in the laser arts, the faces of the gain medium 48 can include fully reflective materials and/or partially reflective materials (not shown) positioned so as to provide amplification of the light signal in the gain medium 48. Trenches 60 extending into the gain medium 48 define a laser ridge 62 in the gain medium 48.

A laser cladding 64 is positioned on the gain medium 48. A first electrical conductor 66 positioned on the cladding 24 includes a contact region 68 that extends through an opening in the laser cladding 64 into contact with a top of the laser ridge 62. The first electrical conductor 66 extends from the contact region 68 across a laser trench 20 to a contact pad 69. The contact pad 69 can be employed to apply electrical energy to the laser.

One or more alignment trenches 70 are positioned between adjacent lasers. For instance, FIG. 2A illustrates two alignment trenches 70 between adjacent lasers and positioned on opposing sides of the laser bar 12. A secondary stop 72 extends upward from the bottom of the alignment trench 70. The secondary stop 72 can include an alignment layer 74 on top of the lower gain medium 52. The alignment layer 74 can include or consist of one or more sub-layers 50 in contact with one another. As will be described in more detail below, the choice of the depth of the alignment layer 74 below the bottom surface of the laser chip determines the vertical alignment between the lasers and the waveguide 13 facets.

The alignment layer 74 illustrated in FIG. 2C includes several sub-layers 50. As will be explained in more detail below, these sub-layers 50 can correspond to sub-layers 50 in the laser ridge 62 which can define the location of the laser mode in the laser ridge 62. For instance, each of the sub-layers 50 in an alignment layer 74 can have a different chemical composition from the one or more immediately neighboring sub-layers 50 and/or each of the sub-layers 50 can have a different chemical composition. For instance, the sub-layers can include or consist of a dopant in the gain medium. Each sub-layers 50 can have a different dopant and/or dopant concentration from the one or more neighboring sub-layers 50 and/or each of the sub-layers 50 can have a different different dopant and/or dopant concentration. As an example, each sub-layer 50 can includes or consists of two or more components selected from a group consisting of In, P, Ga, and As and different sub-layers 50 can have the elements present in different ratios. In another example, each sub-layer 50 includes or consists In, P and none, one, or two components selected from a group consisting of Ga, and As and each of the different sub-layers 50 has these components in a different ratio. Examples of materials that include multiple elements selected from the above group include different compositions of InP with or without dopants such as In(x) P(1-x) or In—Ga—As—P. Additionally, there may be other sub-layers 50 present to compensate for stress due to lattice mismatch between the compositions of the different sub-layers 50. The location of the laser mode in the laser ridge 62 is defined by the different sub-layers 50 as a result of the refractive indices of the different compositions.

Although FIG. 2A through FIG. 2D illustrate a secondary stop 72 extending upward from a bottom of the alignment trench 70 such that walls of the secondary stop 72 are spaced apart from walls of the alignment trench 70, the bottom of the alignment trench 70 can be substantially flat and one or more alignment layers 74 on the bottom of the alignment trench 70 can serve as the secondary stop 72. However, an embodiment having walls of the secondary stop 72 spaced apart from walls of the alignment trench 70 may be preferred to reduce etch induced inconsistencies on the tops of the secondary stops 72.

Secondary alignment recesses 80 extend into the gain medium 48.

An electrically conducting medium 82 is positioned under the gain medium 48. The electrically conducting medium 82 can be used as a ground for each of the lasers when applying electrical energy to a laser.

Figure 3A:
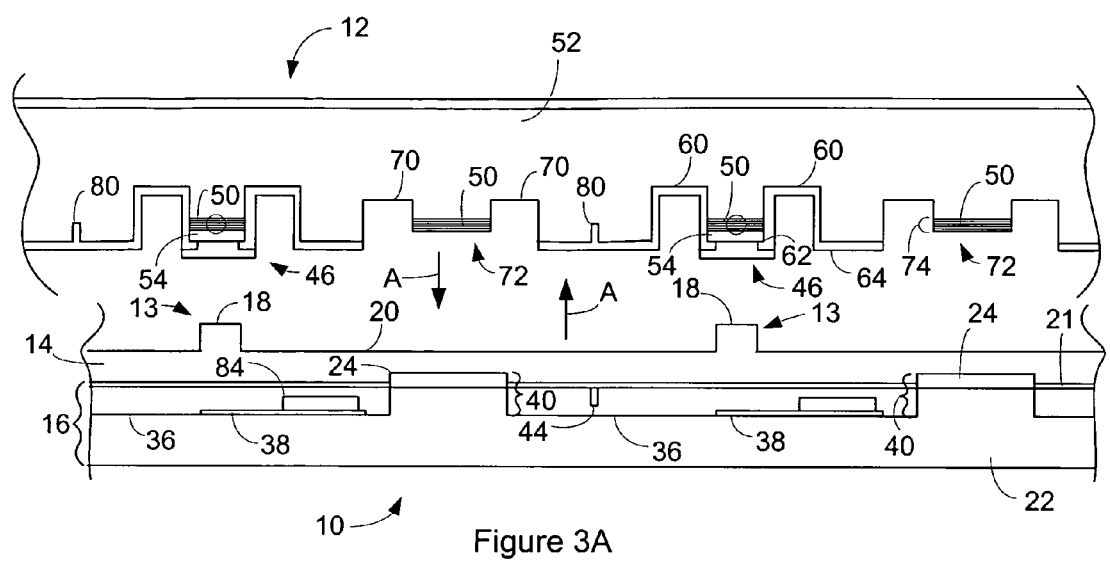
FIG. 3A and FIG. 3B illustrate assembly of the optical system using an optical device constructed according to FIG. 1A through FIG. 1C and a laser bar constructed according to FIG. 2A through FIG. 2D.

FIG. 3A illustrates assembly of the optical system using an optical device 10 constructed according to FIG. 1A through FIG. 1C and a laser bar 12 constructed according to FIG. 2A through FIG. 2D. The optical device 10 illustrated in FIG. 3A does not show either a cross-sectional view or a sideview. Instead, the view of the optical device 10 shows the relative positions of different features of the optical device 10 when looking at a sideview of the optical device 10. In contrast, the laser bar 12 illustrated in FIG. 3A is a cross-sectional view of the laser bar 12 such as the cross section of FIG. 2C.

The optical system can be assembled by moving the optical device 10 and the laser bar 12 toward one another as indicated by the arrows labeled A. The alignment recesses 44 and the secondary alignment recesses 80 are positioned such that they can be aligned with one another during assembly of the optical system. The alignment of these features achieves horizontal alignment of the laser bar 12 and the optical device 10. For instance, alignment of these features achieves horizontal alignment of the waveguide 13 facets with the laser facets.

Additionally, each of the stops 40 on the optical device 10 is aligned with one of the secondary stops 72 on the laser bar 12.

FIG. 3A shows solder pads 38 positioned on the contact pads 38 on the laser platforms 36. The solder pads 38 can be used to immobilize the laser bar 12 relative to the optical device 10 once the laser bar 12 is positioned on the optical device 10. The solder pads 38 can also provide electrical communication between the contact pad 38 and the contact pad 38 that is in electrical communication with one of the lasers on the laser bar 12.

Figure 3B:
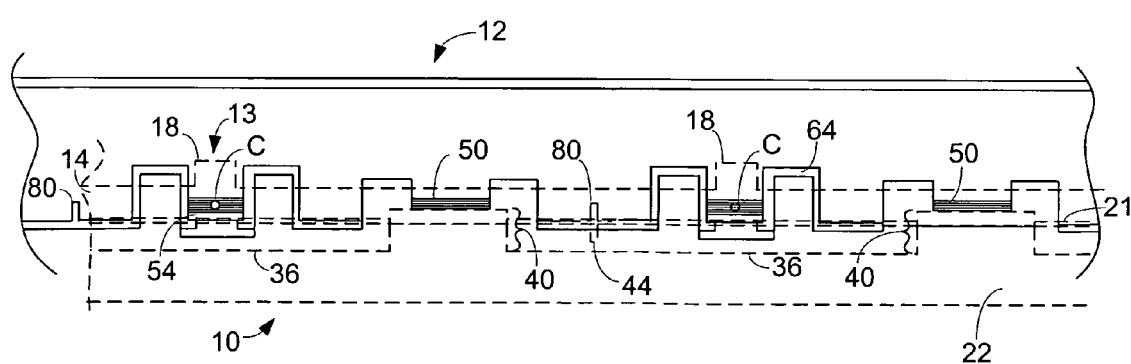

FIG. 3B illustrates the optical device 10 as shown in FIG. 3A and the laser bar 12 as shown in FIG. 3A assembled in an optical assembly according to FIG. 1A. For the purposes of clarity, the optical device 10 is shown by the dashed lines while the laser bar 12 is shown by solid lines. The solder pads 38 are also removed from this illustration. Each of the stops 40 on the optical device 10 meets one of the secondary stops 72 on the laser bar 12. As a result, the vertical movement of the optical device 10 and the laser bar 12 toward one another is limited by the stops 40 butting against the secondary stops 72.

As is evident in FIG. 3B, the height of the laser mode relative to the waveguides 13 is a function of the thickness of the alignment layer 74. For instance, increasing the thickness of the alignment layer 74 can elevate the laser mode relative to the waveguides 13. As a result, the alignment layer 74 is formed to place the laser mode in vertical alignment with the facets of the waveguides 13. For instance, the circles labeled C in FIG. 3B can illustrate the laser mode and also the desired location for the light signal to enter waveguide 13. Since the laser mode and the desired location of the light signal to enter waveguide 13 overlap, the thickness of the alignment layer is such that alignment of the laser mode and the waveguide 13 has been achieved.

Figure 4A:
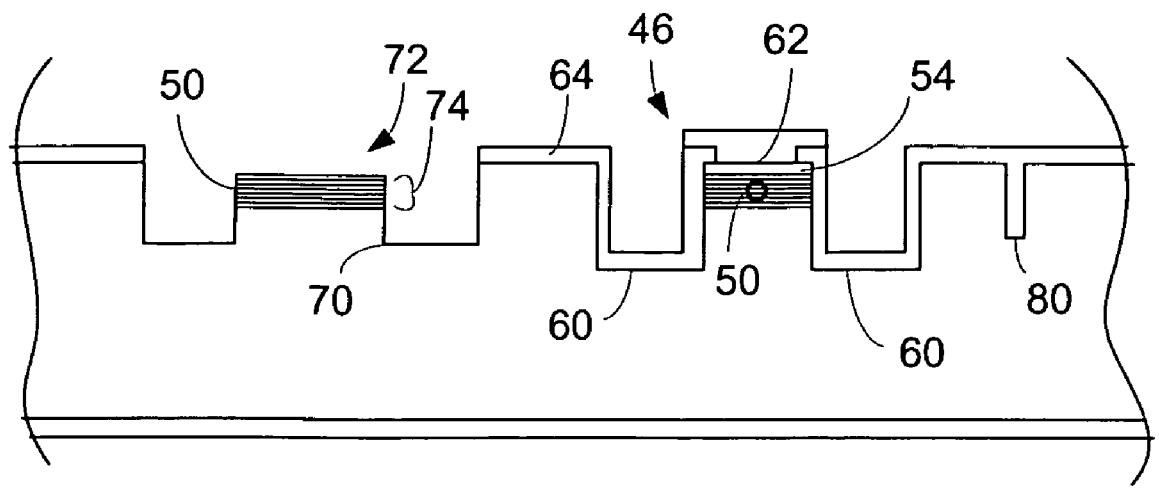
FIG. 4A through FIG. 4B illustrate method of controlling the height of the alignment layer relative to the laser mode.
Figure 4B:
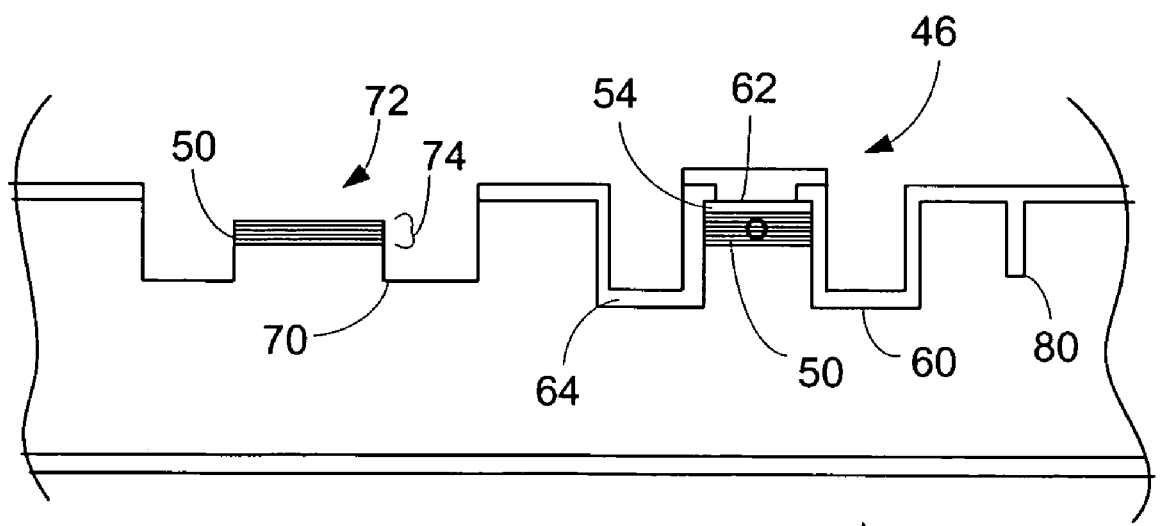

Since vertical alignment is achieved by achieving a particular height of laser mode relative to the waveguides 13 and since the height of the laser mode relative to the waveguides 13 is a function of the thickness of the alignment layer 74, a method is presented for controlling the thickness of the alignment layer 74. For instance, FIG. 4A through FIG. 4B illustrate method of controlling the height of the alignment layer 74 relative to the laser mode. FIG. 4A is a cross-section of a laser bar 12 such as the cross-section of FIG. 2C and is taken before the formation of the secondary stop 72 is completed. Because the formation of the secondary stop 72 is not completed, the secondary stop 72 includes more sub-layers 50 than are illustrated in FIG. 2C. As evident in FIG. 2C, each of the sub-layers 50 can be included in the secondary stop 72. Each of the sub-layers 50 in the alignment layer 74 of FIG. 4A corresponds to a sub-layer 50 in the laser ridge 62. For instance, each of the sub-layers 50 in the alignment layer 74 of FIG. 4A can have the same chemical composition of one of the sub-layers 50 in the laser ridge 62. Additionally or alternately, each of the sub-layers 50 in the alignment layer 74 of FIG. 4A can be at the same height as the corresponding sub-layers 50 in the laser ridge 62 and/or have the same thickness as the corresponding sub-layers 50 in the laser ridge 62.

Since the sub-layers 50 in the secondary stop 72 each corresponds to a sub-layer 50 in the laser ridge 62 and the sub-layers 50 in the laser ridge 62 define the position of the laser mode in the laser ridge 62, the location of each sub-layer 50 in the secondary stop 72 relative to the laser mode is known.

Each of the sub-layers 50 in the laser ridge can have different chemical composition from the one or more immediately neighboring sub-layers 50 in the laser ridge and/or each of the sub-layers 50 in the laser ridge can have a different chemical composition. For instance, the sub-layers can include or consist of a dopant in the gain medium. Each sub-layers 50 can have a different dopant and/or dopant concentration from the one or more neighboring sub-layers 50 and/or each of the sub-layers 50 can have a different different dopant and/or dopant concentration. As an example, each sub-layer 50 can includes or consists of two or more components selected from a group consisting of In, P, Ga, and As and different sub-layers 50 can have the elements present in different ratios. In another example, each sub-layer 50 includes or consists In, P and none, one, or two components selected from a group consisting of Ga, and As and each of the different sub-layers 50 has these components in a different ratio. Examples of materials that include multiple elements selected from the above group include different compositions of InP with or without dopants such as $In(x)\ P(1-x)$ or In—Ga—As—P. Additionally, there may be other sub-layers 50 present to compensate for stress due to lattice mismatch between the compositions of the different sub-layers 50. The location of the laser mode in the laser ridge 62 is defined by the different sub-layers 50 as a result of the refractive indices of the different compositions.

The different compositions of the sub-layers 50 in the unfinished secondary stop 72 of FIG. 4A can be employed to control the thickness of the alignment layer 74. For instance, one or more sub-layers 50 can be removed from the unfinished secondary stop 72 until the alignment layer 74 has the desired thickness. As an example, the top two layers of the unfinished secondary stop 72 of FIG. 4A are removed in order to provide the secondary stop 72 illustrated in FIG. 4B. The one or more sub-layers 50 can be removed by etching. The etch can be chosen such that the sub-layer 50 that will serve as the uppermost sub-layer 50 of the completed alignment layer 74 acts as an etch stop. As a result, the thickness of the alignment layer 74 can be controlled by selecting the sub-layer 50 that will serve as the etch stop and then selecting the appropriate etch. Further, since the height of each sub-layer 50 relative to the laser mode is fixed, the ability to control the thickness of the alignment layer 74 also allows the height of the alignment layer 74 relative to the laser mode to be both known and controlled.

In some instances, before any of the sub-layers 50 are removed from the alignment layer 74, the alignment layer 74 can have more than 3 sub-layers 50, more than 5 sub-layers 50, more than 7 sub-layers 50, or more than 9 sub-layers 50. Accordingly, the laser ridge can have more than 3 sub-layers 50, more than 5 sub-layers 50, more than 7 sub-layers 50, or more than 9 sub-layers 50.

Although FIG. 4A and FIG. 4B illustrate components such as the laser cladding 64 and first electrical conductor 66 in place on the laser bar 12 at the time the sub-layers 50 are removed from the unfinished secondary stop 72, the sub-layers 50 can be removed from the secondary stop 72 before any, all, or a portion of these components are formed on the laser bar 12.

A laser bar 12 having a secondary stop 72 and laser ridge 62 with sub-layers 50 having different compositions can be fabricated by using epitaxial growth to grow each sub-layer 50 on the lower gain medium 52. Although the above figures show the sub-layers 50 only being located in the secondary stop 72 and the laser ridge 62, the sub-layers 50 can be positioned elsewhere in the gain medium. Accordingly, the sub-layers 50 can optionally be grown across the entire gain medium. Epitaxial growth can then be used to grow the upper gain medium 54 on the uppermost sub-layer 50. The alignment trenches 70, trenches 20, and secondary stops 72 can be formed in the result through masking and etching steps. The laser cladding 64, the first electrical conductor 66, and the electrically conducting medium 82 can be formed after etching of the alignment trenches 70, trenches 20, and secondary stops 72 or can be formed at other times during fabrication of the laser bar 12.

An optical device 10 according to FIG. 1C can be fabricated by etching the ridges 18 for the waveguides 13. The secondary platform 42 and the base portion of the stops 40 can be etched by etching through the first light transmitting medium using an etch for which the light insulator 21 acts as an etch stop followed by etching through the light insulator 21 using an etch for which the substrate 22 acts as an etch stop. The alignment marks can be etched into the first light-transmitting medium 14 and the cladding 24 can be deposited on the first light-transmitting medium 14 and on the base portion of the stops 40. Additional components such as the contact pads and other electrical components can then be formed on the optical device 10. An additional etch can be used to etch the secondary platform 42 below the level of the light insulator 21 (i.e. etch into the substrate 22) but without etching the base portion of the stops 40. Alternately, the additional etch can remove the secondary platform 42 altogether.

Once the optical device 10 and laser bar 12 are generated by purchase from a supplier and/or fabrication, the system can be assembled by placing the laser bar 12 on the optical device 10. In an optical device 10 constructed according to FIG. 1C, the height of the stops 40 can be determined from the fabrication process or can be measured. The height of the stops 40 can be combined with the desired height of the laser mode to determine the alignment layer 74 thickness needed to achieve the desired vertical alignment. The sub-layer 50 that would serve as the upper-most sub-layer 50 in an alignment layer 74 having the desired thickness can then be identified. An etch or serial combination of etches that would expose the identified sub-layer 50 without detrimentally etching the identified sub-layer 50 can also be identified. The identified etches can then be performed so as to remove one or more sub-layers 50 above the identified sub-layer 50 and expose the identified sub-layer 50. The laser bar 12 can then be positioned on the optical device 10 with the stops 40 extending into the alignment trenches and contacting (or butting against) the secondary stops 72 as evident in FIG. 3B.

The above discussions disclose using a first material as an etch stop against an etch configured to etch a second material in contact with the first material. A first material acts as an etch stop when the etch is significantly more corrosive (often called more selective) of the second material than of the first material. As a result, once the etch etches through the second material to the first material, the etch rate drops. Because the etch rate drops, the importance of the etch duration drops and the etch can be executed for a period of time that ensures that the second material will be etched without significantly etching into the first material.

Although the laser bar 12 is disclosed as having a plurality of lasers, the disclosure can be adapted for use with a laser or laser bar 12 that includes no more than one laser. For instance, the disclosed laser bar 12 can be scaled down to one laser and the number of stops 40 on the optical device 10 can also be appropriately scaled. Additionally, although the laser bar 12 can have a bar structure, the laser bar 12 need not have a bar shape. For instance, the laser bar 12 can be a one piece device 10 having a laser array or a structure that includes lasers that are immobilized relative to one another before being positioned on the optical device 10.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of forming an optical system, comprising:
   generating an optical device having waveguides defined in a first light transmitting medium, the first light-transmitting medium being positioned on a base, the optical device including stops extending upward from a laser platform;
   generating a laser bar, the laser bar having lasers that are each at least partially defined by a ridge that includes a gain medium, each of the ridges having a plurality of ridge layers,
   the laser bar also having alignment trenches that each includes a secondary stop, each of the secondary stops including sub-layers in contact with one another,
   each of the sub-layers having a different chemical composition than the one or more sub-layers that contact the sub-layer,
   the sub-layers each corresponding to one of the ridge layers in that each sub-layer has the same chemical composition as the corresponding ridge layer removing one or more of the sub-layers; and
   placing the laser bar on the laser platform such that each laser is aligned with one of the waveguides and with the stops each extending into one of the alignment trenches such that each of the stops contacts one of the secondary stops.

2. The method of claim 1, wherein the sub-layers are between an upper layer of the gain medium and a lower layer of the gain medium.

3. The method of claim 1, wherein each of the sub-layers is defined by a layer of the gain medium that includes a dopant.

4. The method of claim 1, wherein one of the sub-layers defines a top of each secondary stop.

5. The method of claim 1, wherein removing one or more of the sub-layers includes etching away the one or more layers.

6. The method of claim 5, wherein an etch employed in etching away the one or more sub-layers is more corrosive to the one or more sub-layers than the layer immediately under the one or more dub-layers such that the layer immediately under the one or more sub-layers acts as an etch stop against the etch.

7. The method of claim 1, wherein each of the secondary stops extends upward from a bottom of one of the alignment trenches.

8. The method of claim 1, wherein removing the one or more sub-layers causes a height of the laser bar relative to the optical device to be decreased from where the height would have been if the one or more layers were not removed.

9. The method of claim 1, wherein the number of layers in the secondary stop before removing the one or more layers is greater than 3.

10. The method of claim 1, wherein the a recess extends into the base so as to define the laser platform, the stops extending upward from the platform, and placing the laser bar on the optical device includes placing the laser bar on the laser platform.

11. The method of claim 10, wherein the base includes a light insulator on a substrate, the light insulator contacting the first light-transmitting medium and having a lower index of refraction than the first light-transmitting medium,
   a portion of the substrate extending upward from the laser platform and being included in the stops, a cladding being positioned on the waveguides and also being included in each of the stops.

12. An optical system, comprising:

an optical device having optical waveguides defined in a first light transmitting medium, the first light-transmitting medium being positioned on a base, the optical device including stops extending upward from a laser platform;

a laser bar having lasers, the laser bar being positioned on the platform such that each laser is aligned with one of the waveguides, the laser bar including alignment trenches that each includes a secondary stop extending upward from a bottom of the alignment trench, the secondary stop including layers of material having different composition;

the stops each extending into an alignment trenches such that each stop contacts one of the secondary stops.

13. The system of claim 12, wherein the layers each has a different composition and includes two or more elements selected from a group consisting of In, P, Ga, and As.

14. The system of claim 12, wherein the layers are also present in ridges on the laser bar, each of the lasers each being configured to at least partially generate a light signal within one of the ridges.

15. The system of claim 12, wherein the laser is positioned on the platform such that removing one or more of the layers would reduce the height of the laser bar relative to the optical device.

16. The system of claim 12, wherein a recess extends into part way the base such that a portion of the base defining a bottom of the recess defines the laser platform and such that the stops extend upward from the platform.

17. The system of claim 16, wherein the base includes a light insulator on a substrate, the light insulator contacting the first light-transmitting medium and having a lower index of refraction than the first light-transmitting medium, a portion of the substrate extending upward from the laser platform and being included in the stops, a cladding being positioned on the waveguides and also being included in each of the stops.

18. An optical system, comprising:

an optical device having waveguides defined in a first light transmitting medium, the first light-transmitting medium being positioned on a base, the optical device including stops extending upward from a laser platform;

a laser bar having lasers that are each at least partially defined by a ridge that includes a gain medium, each of the ridges having a plurality of ridge layers, the laser bar also having alignment trenches that each includes a secondary stop, each of the secondary stops including sub-layers in contact with one another, each of the sub-layers having a different chemical composition than the one or more sub-layers that contact the sub-layer, the sub-layers each corresponding to one of the ridge layers in that each sub-layer has the same chemical composition as the corresponding ridge layer; and the laser bar being positioned on the platform such that each laser is aligned with one of the waveguides and with the stops each extending into one of the alignment trenches such that each of the stops contacts one of the secondary stops.

19. The system of claim 18, wherein the sub-layers are between an upper layer of the gain medium and a lower layer of the gain medium.

20. The system of claim 19, wherein each of the sub-layers is defined by a doped layer of the gain medium.

21. The system of claim 18, wherein a top of one of the layer defines a top of each secondary stop.

22. The system of claim 18, wherein the layers each has a different composition and includes two or more elements selected from a group consisting of In, P, Ga, and As.

23. The system of claim 18, wherein each of the secondary stops extends upward from a bottom of one of the alignment trenches.

24. The system of claim 18, wherein the layers are also present in ridges on the laser bar, each of the lasers each being configured to at least partially generate a light signal within one of the ridges.

25. The system of claim 18, wherein a recess extends into part way the base such that a portion of the base defining a bottom of the recess defines the laser platform and such that the stops extend upward from the platform.

26. The system of claim 25, wherein the base includes a light insulator on a substrate, the light insulator contacting the first light-transmitting medium and having a lower index of refraction than the first light-transmitting medium, a portion of the substrate extending upward from the laser platform and being included in the stops, a cladding being positioned on the waveguides and also being included in each of the stops.

* * * * *